US012720603B2

(12) United States Patent
Fan

(10) Patent No.: US 12,720,603 B2
(45) Date of Patent: Aug. 25, 2026

(54) RANDOM ACCESS RESOURCE SELECTION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 310 days.

(21) Appl. No.: 18/475,189

(22) Filed: Sep. 26, 2023

(65) Prior Publication Data

US 2024/0015802 A1 Jan. 11, 2024

Related U.S. Application Data

(63) Continuation of application No. PCT/CN2021/083653, filed on Mar. 29, 2021.

(51) Int. Cl.
*H04W 74/0833* (2024.01)

(52) U.S. Cl.
CPC ................................ *H04W 74/0833* (2013.01)

(58) Field of Classification Search
CPC ........... H04W 74/0833; H04W 56/004; H04W 74/006; H04B 7/18513; H04B 7/1855
See application file for complete search history.

(56) References Cited

U.S. PATENT DOCUMENTS

2021/0219349 A1* 7/2021 Huang ................ H04W 74/002
2022/0159741 A1* 5/2022 Hoang ............... H04W 74/0833
2022/0225415 A1* 7/2022 Shrestha ........... H04W 28/0278
2023/0328794 A1* 10/2023 Cheng ............... H04W 74/0833 370/329
2024/0032105 A1* 1/2024 Xu ...................... H04W 64/003
2024/0090037 A1* 3/2024 Wigard ................. G01S 19/396

FOREIGN PATENT DOCUMENTS

CN 109845378 6/2019
CN 110913499 3/2020
CN 111278153 6/2020
CN 111565473 8/2020

(Continued)

OTHER PUBLICATIONS

EPO, Extended European Search Report for EP Application No. 21933576.7, Jul. 29, 2024.

(Continued)

*Primary Examiner* — Yu-Wen Chang
(74) *Attorney, Agent, or Firm* — Hodgson Russ LLP

(57) ABSTRACT

A method for selecting a random access resource includes: selecting, by a terminal device, the random access resource based on at least one of predefined manners, wherein the predefined manners include: selection based on a round-trip time (RTT) acquired by the terminal device; selection based on an absolute distance of a service link; selection based on a delay compensation of a feeder link; selection based on service identity information for triggering a random access procedure by the terminal device; selection based on a terminal type of the terminal device; and selection based on an access probability parameter.

20 Claims, 4 Drawing Sheets

200

A terminal device selects a random access resource on the basis of at least one pre-defined mode, wherein the pre-defined mode comprises:
performing selection on the basis of a round trip time (RTT) acquired by the terminal device;
performing selection on the basis of an absolute distance of a service link;
performing selection on the basis of a time delay compensation amount of a feed link;
performing selection on the basis that the terminal device triggers service identification information of a random access process;
performing selection on the basis of a terminal type of the terminal device; and
performing selection on the basis of an access probability parameter

S210

(56) References Cited

FOREIGN PATENT DOCUMENTS

| | | |
|---|---|---|
| CN | 112423402 | 2/2021 |
| WO | 2018132843 | 7/2018 |

OTHER PUBLICATIONS

EPO, Partial Supplementary European Search Report for EP Application No. 21933576.7, May 8, 2024.
Zte et al., "Consideration on Random Access for NTN," 3GPP TSG RAN WG2#113-e, R2-2101584, Jan. 2020.
"3rd Generation Partnership Project; Technical Specification Group Radio Access Network; NR; Radio Resource Control (RRC) protocol specification (Release 16)," 3GPP TS 38.331, Jan. 2021, v16.3.1.
"3rd Generation Partnership Project; Technical Specification Group Radio Access Network; NR; Medium Access Control (MAC) protocol specification (Release 16)," 3GPP TS 38.321, Dec. 2020, v16.3.0.
WIPO, International Search Report and Written Opinion for PCT/CN2021/083653, Dec. 16, 2021.

* cited by examiner

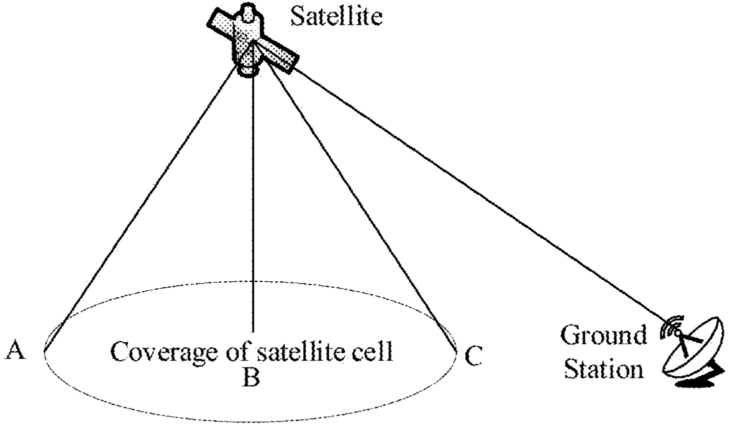

A terminal device selects a random access resource on the basis of at least one pre-defined mode, wherein the pre-defined mode comprises:
performing selection on the basis of a round trip time (RTT) acquired by the terminal device;
performing selection on the basis of an absolute distance of a service link;
performing selection on the basis of a time delay compensation amount of a feed link;
performing selection on the basis that the terminal device triggers service identification information of a random access process;
performing selection on the basis of a terminal type of the terminal device; and
performing selection on the basis of an access probability parameter

Send, by network device, a delay compensation of a feeder link to a terminal device through a system broadcast message or a dedicated signaling, where the delay compensation is configured for the terminal device to select the random access resource

RANDOM ACCESS RESOURCE SELECTION METHOD, TERMINAL DEVICE AND NETWORK DEVICE

CROSS-REFERENCE TO RELATED APPLICATION

This application is a continuation of International Application No. PCT/CN2021/083653, filed Mar. 29, 2021, the entire disclosure of which is incorporated herein by reference.

TECHNICAL FIELD

This application relates to the field of communications, and more particularly, to a method for selecting a random access resource(s), a terminal device and a network device.

BACKGROUND

The 5G New Radio (NR) system supports a four-step random access mechanism (4-step RACH) and a two-step random access mechanism (2-step RACH). In the related art, the terminal device will first select the random access type before initiating the random access procedure, that is, choose to use the 4-step RACH or the 2-step RACH. This procedure is determined based on the reference signal received power (RSRP) threshold configured by the network. When the RSRP value of the serving cell or the target cell measured by the terminal device is greater than the RSRP threshold configured by the network, the terminal device chooses the 2-step RACH for initiating a random access attempt; otherwise, the terminal device chooses the 4-step RACH for initiating a random access attempt.

However, for a satellite cell, the signal measurement results received by any terminal device in the satellite signal coverage area are generally not very different. In addition to the influence of the measurement error of the terminal device itself, it is difficult to select the random access type by means of the RSRP threshold. Therefore, a new mechanism may need to be defined in the satellite system for terminal devices to select a random access resource(s).

SUMMARY

Some embodiments of this application provide a method for selecting a random access resource(s), a terminal device and a network device, which can be applied to the selection process of a random access resource(s) by a terminal device in a satellite system.

Some embodiments of this application provide a method for selecting a random access resource(s), including:

selecting, by a terminal device, the random access resource(s) based on at least one of predefined manners, where the predefined manners includes:

selection based on a round-trip time (RTT) acquired by the terminal device;

selection based on an absolute distance of a service link;

selection based on a delay compensation of a feeder link;

selection based on service identity information for triggering a random access procedure by the terminal device;

selection based on a terminal type of the terminal device; and selection based on an access probability parameter.

Some embodiments of this application further provide a method for selecting a random access resource(s), including:

sending, by a network device, a delay compensation of a feeder link to a terminal device through a system broadcast message or a dedicated signaling, where the delay compensation is configured for the terminal device to select a random access resource(s).

Some embodiments of this application further provide a terminal device, including:

a selecting module, configured to select a random access resource(s) based on at least one of predefined manners, wherein the predefined manners comprise:

selection based on an RTT acquired by the terminal device;

selection based on an absolute distance of a service link;

selection based on a delay compensation of a feeder link;

selection based on service identity information for triggering a random access procedure by the terminal device;

selection based on a terminal type of the terminal device; and selection based on an access probability parameter.

Some embodiments of this application provide a network device, including: a feeder link delay compensation sending module, configured to send a delay compensation of a feeder link to a terminal device through a system broadcast message or a dedicated signaling, wherein the delay compensation is configured for the terminal device to select a random access resource(s).

Some embodiments of this application further provide a terminal device, including: a processor and a memory, where the memory is used to store a computer program, and the processor is used to call and run the computer program stored in the memory, thereby implementing any of the above methods.

Some embodiments of this application further provide a network device, including: a processor, a memory, and a transceiver, where the memory is used to store a computer program, the processor is used to call and run the computer program stored in the memory, and control the transceiver to implement any of the above methods.

Some embodiments of this application further provide a chip, including: a processor, configured to call and run a computer program from a memory, thereby causing a device installed with the chip to implement the method performed by any of the foregoing terminal devices.

Some embodiments of this application further provide a chip, including: a processor, configured to call and run a computer program from a memory, thereby causing a device installed with the chip to implement the method performed by any of the foregoing network devices.

Some embodiments of this application further provide a computer-readable storage medium for storing a computer program, the computer program causing a computer to implement the method performed by any of the foregoing terminal devices.

Some embodiments of this application further provide a computer-readable storage medium for storing a computer program, the computer program causing a computer to implement the method performed by any of the foregoing network devices.

Some embodiments of this application further provide a computer program product, including computer program instructions, where the computer program instructions cause a computer to implement the method performed by any of the foregoing terminal devices.

Some embodiments of this application further provide a computer program product, including computer program instructions, where the computer program instructions cause a computer to implement the method performed by any of the foregoing network devices.

Some embodiments of this application further provide a computer program, where the computer program causes a computer to implement the method performed by any of the foregoing terminal devices.

Some embodiments of this application also further a computer program, where the computer program causes a computer to implement the method performed by any of the foregoing network devices.

In some embodiments of this application, the terminal device selects the random access resource(s) based on at least one predefined manner, so that the terminal device can flexibly select the random access resource(s) before triggering the random access procedure, and more reasonably perform selection between a two-step random access resource(s) and a four-step random access resource(s), thereby improving the utilization rate of random access resource(s). Some embodiments of this application are especially applicable to the selection of random access resource(s) by terminal device in a satellite system.

BRIEF DESCRIPTION OF THE DRAWINGS

FIG. 1 is a schematic diagram of an application scenario according to some embodiments of this application.

FIG. 2 is a schematic flowchart of a method 200 for selecting a random access resource(s) according to some embodiments of this application.

FIG. 3 is a schematic flowchart of a method 300 for selecting a random access resource(s) according to some embodiments of this application.

DETAILED DESCRIPTION

Figure 4:
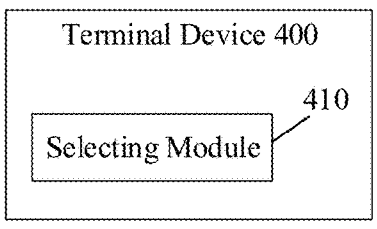
FIG. 4 is a block diagram of a terminal device 400 according to some embodiments of this application.

Technical solutions in some embodiments of this application will be described below with reference to the accompanying drawings according to some embodiments of this application.

It should be noted that the terms "first" and "second" in the description and claims as well as the drawings according to some embodiments of this application are used to distinguish similar objects, and are not necessarily used to describe a specific order or sequence. The objects described by "first" and "second" at the same time may be the same or different.

The technical solutions in some embodiments of this application may be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, evolution system of NR system, LTE-based access to unlicensed spectrum (LTE-U), NR-based access to unlicensed spectrum (NR-U) system, Universal Mobile Telecommunication System (UMTS), Wireless Local Area Networks (WLAN), Wireless Fidelity (WiFi), 5th-Generation, 5G) system or other communication systems.

Generally speaking, traditional communication systems support a limited number of connections and are easy to implement. However, with the development of communication technology, mobile communication systems will not only support traditional communication, but also support, for example, D2D (Device to Device) communication, M2M (Machine to Machine) communication, MTC (Machine Type Communication), V2V (Vehicle to Vehicle) communication, and the like. Embodiments of this application can also be applied to these communications systems.

Optionally, the communication system in some embodiments of this application may be applied to a CA (Carrier Aggregation) scenario, a DC (Dual Connectivity) scenario, or a SA (Standalone) networking scenario.

Embodiments of this application do not limit the applied spectrum. For example, some embodiments of this application may be applied to licensed spectrum, and may also be applied to unlicensed spectrum.

Various embodiments of this application are described in conjunction with network device and terminal device, where the terminal device may also be referred to as user equipment (UE), access terminal, subscriber unit, subscriber station, mobile station, mobile site, remote station, remote terminal, mobile device, user terminal, terminal, wireless communication device, user agent, user device, or the like. The terminal device may be a station (ST) in the WLAN, or may be a cellular phone, a cordless phone, a session initiation protocol (SIP) phone, a wireless local loop (WLL) station, a personal digital processing (PDA) device, a handheld device with wireless communication capabilities, a computing device or other processing devices connected to wireless modems, or may be an in-vehicle device, a wearable device, and a terminal device in next-generation communication systems, such as the NR network, future-evolved public land mobile network (PLMN), or the like.

As an example without limitation, in some embodiments of this application, the terminal device may also be a wearable device. Wearable devices may also be called wearable smart devices, which are the general term for the intelligent design of daily wear and the development of wearable devices using wearable technology, such as glasses, gloves, watches, clothing and shoes. Wearable device is a portable device that is worn directly on the body or integrated into the user's clothing or accessories. Wearable device is not only a hardware device, but also realizes powerful functions through software support, data interaction, and cloud interaction. In a general sense, wearable smart devices may be of full-feature, large-scale, with complete or partial functions without relying on smart phones, including such as smart watches or smart glasses; or may only focus on a certain type of application function, which needs to cooperate with other devices such as smart phones, including such as various smart bracelets, and smart jewelry for physical sign monitoring.

The network device may be a device for communicating with a mobile device. For example, the network device may be an access point (AP) in WLAN, or a base transceiver station (BTS) in GSM or CDMA, a NodeB (NB) in WCDMA, an evolutional Node B (eNB or eNodeB) in LTE, a relay station, an access point, an in-vehicle device, a wearable device, a network device (gNB) in NR network, a network device in the future-evolved PLMN network, or the like.

In some embodiments of this application, the network device provides services for a cell, and the terminal device communicates with the network device through transmission resources (e.g., frequency domain resources, or spectrum resources) used by the cell, and the cell may be a cell corresponding to the network device (e.g., base station). The cell may belong to a macro base station, or may belong to a base station corresponding to a small cell, where the small cell may include a metro cell, a micro cell, a pico cell, a femto cell, and the like. These small cells have the characteristics of small coverage and low transmit power, and are suitable for providing high-speed data transmission services.

It should be understood that the terms "system" and "network" are often used interchangeably herein. The term "and/or" in this article is only used to describe an association relationship of associated objects, indicating that there may be three kinds of relationships. For example, as to "A and/or B", it may mean three cases: A exists alone, both A and B exist, and B exists alone. In addition, the character "/" in this document generally indicates that the related objects are in an "or" relationship.

It should be understood that the "indication" mentioned in some embodiments of this application may be a direct indication, an indirect indication, or may represent presence of an associated relationship. For example, if A indicates B, it may mean that A directly indicates B, for example, B can be acquired through A; it may also mean that A indicates B indirectly, for example, A indicates C, and B can be acquired through C; it may also mean that there is an associated relationship between A and B.

In the description of some embodiments of this application, the term "corresponding" may indicate that there is a direct or indirect correspondence between two objects, or may indicate that there is an associated relationship, or a relationship of indicating and being indicated, or a relationship of configuring and being configured, between the two objects.

In order to facilitate the understanding of the technical solutions according to some embodiments of this application, the related technologies of some embodiments of this application are described below. The following related technologies can be arbitrarily combined with the technical solutions according to some embodiments of this application as optional solutions, which should fall within the protection scope of some embodiments of this application.

The four-step random access mechanism (4-step RACH) is a function introduced in NR R15. The four-step random access procedure includes the following steps.

In step 1, a message corresponding to step 1 is also called MSG 1. The terminal device sends the random access preamble to the network device through the random access channel. In this process, the terminal device needs to select a time-frequency resource, that is, a random access opportunity (i.e., RACH Occasion, RO), so as to send the random access preamble.

In step 2, a message corresponding to step 2 is also called MSG 2. Under normal circumstances, the network device needs to reply MSG2 to the terminal device within a certain time window after receiving MSG1 sent by the terminal device. MSG2 includes information such as scheduling resources of MSG3, the temporary Cell Radio Network Temporary Identity (C-RNTI) allocated by the network for being used by the terminal device, the time advance from the terminal device to the network estimated by the network, and the RACH failure backoff time parameter.

In step 3, a message corresponding to step 3 is also called MSG 3, which mainly includes information such as the identity of the terminal device itself, the cause of access and the like.

In step 4, a message corresponding to step 4 is also called MSG 4, which is mainly used by the network device to inform the terminal device of configuration information of SRB1 and contention resolution.

Under the 4-step RACH, one random access procedure may include multiple random access attempts. Because random access attempts may also fail, the network device generally informs, through a configuration process, the terminal device of the maximum number M (M is a positive integer) of random access attempts in one random access procedure. Once the terminal device continuously triggers M times of random access attempts but fails, the terminal device will consider that the random access procedure has failed.

The two-step random access mechanism (2-step RACH) is a function introduced in NR R16. The two-step random access procedure includes the following steps.

In step 1, a message corresponding to step 1 is also called MSG A, which may be simply understood as being acquired by combining the functions of MSG 1 and MSG 3 in the four-step random access procedure before sending the same.

In step 2, a message corresponding to step 2 is also called MSG B, which may be simply understood as being acquired by combining the functions of MSG 2 and MSG 4 in the four-step random access procedure before sending the same.

Under the 2-step RACH, the network device may also inform, through a configuration process, the terminal device of the maximum number M (M is a positive integer) of random access attempts in one random access procedure. Once the terminal device continuously triggers M times of random access attempts but fails, the terminal device will consider that the random access procedure has failed. This is the same as the 4-step RACH, but there are differences between the two mechanisms. When the network device is configured with resources of 2-step RACH and of 4-step RACH at the same time, the network device may configure the terminal device with an additional threshold N, which is to be used for the terminal device to backoff to using the four-step random access attempt after N consecutive two-step random access attempts fail, where N is usually a positive integer less than M. If the network device does not configure the above-mentioned threshold N, the terminal device cannot backoff to using the 4-step RACH after selecting the 2-step RACH.

When the network device configures resources of two-step random access and four-step random access as well as the backoff threshold N, the terminal device may be involved in both two-step random access attempts and four-step random access attempts in one random access procedure. Otherwise, when the aforementioned conditions are not satisfied, the terminal device may only adopt a single type of random access mechanism in one random access procedure. Until the terminal device continuously triggers M times of random access attempts of the single type, the terminal device will consider that this random access procedure has failed.

In the related art, the terminal device will first select the random access type (two-step or four-step random access) before initiating the random access procedure. This process is performed based on the RSRP threshold configured by the network. When the terminal device detects that the RSRP value of the serving cell or a target cell is greater than the RSRP threshold configured by the network, the terminal device selects to use the two-step random access manner to initiate a random access attempt; otherwise, the terminal device selects to use the four-step random access manner to initiate a random access attempt.

The 2-step RACH saves time delay compared with the 4-step RACH, but because the MSG A carries a large amount of information in the two-step random access procedure, under the same channel conditions, the probability of the MSG A being decoded incorrectly by the network will be higher than MSG 1. Accordingly, the existing NR R16 standard stipulates that only when the RSRP measurement result of the target cell is higher than the RSRP threshold configured by the target cell, the terminal device can select the two-step random access type to initiate the random access attempt. Otherwise, the terminal device may only initiate random access attempts using the four-step random access type. Such approach is also to take advantage of the 2-step RACH as much as possible.

However, the above approach cannot be applied to satellite systems. Satellites may be divided into Geostationary Earth Orbit (GEO), Medium Earth Orbit (MEO) and Low Earth Orbit (LEO). GEO has its coverage diameter reaching thousands of kilometers (usually 3 satellites cover the world), and is stationary relative to the ground. MEO/LEO, depending on the orbital heights, has its coverage diameters ranging from tens of kilometers to thousands of kilometers. While terrestrial cells usually cover a diameter of several hundred meters to thousands of meters, the coverage of satellite cells is much larger than that of terrestrial cells. Because the signal coverage characteristics of satellite cells are different from those of terrestrial cells, the signal measurement results received by any terminal device in the satellite signal coverage area are generally not very different, that is to say, the far-near effect in the satellite coverage area is less obvious than that of terrestrial cells.

FIG. 1 is a schematic diagram illustrating a signal coverage of a satellite cell. The satellite in FIG. 1 may be a transparent-relay type satellite, in which case the base station is located at the ground station, and the satellite is only used for signal amplification and transparent relay for the ground station. The satellite in FIG. 1 may also have full functions of the base station (in this scenario, the satellite has a complete communication protocol stack) or some functions thereof (this scenario refers to the CU-DU separation scenario, at this time, the CU is the ground station, and the DU is in the satellite).

No matter what type of satellite the satellite belongs to, due to the great height of the satellite orbit from the ground (usually ranging from several hundred kilometers to tens of thousands of kilometers), the absolute distances between the satellite and respective points in the coverage area of the satellite cell in FIG. 1 (e.g., point A, point B and point C) are almost the same. As the satellite signal measurement result is mainly related to the distance from the satellite to the terminal device, so the satellite cell measurement results measured by any terminal device under the coverage area of a satellite cell are not much different. In addition to the influence of the measurement error of the terminal device itself, it is difficult to use the method for selecting the random access resource(s) based on the RSRP threshold of the target cell in the related art.

Some embodiments of this application propose a method for selecting a random access resource(s). FIG. 2 is a schematic flowchart of a method 200 for selecting a random access resource(s) according to some embodiments of this application. The method can optionally be applied to the system shown in FIG. 1, but is not limited thereto. The method includes at least some of the following.

In S210, the terminal device selects a random access resource(s) based on at least one of predefined manners, where the predefined manners includes:

selection based on a round-trip time (RTT) acquired by the terminal device;

selection based on an absolute distance of a service link;

selection based on a delay compensation of a feeder link;

selection based on service identity information for triggering a random access procedure by the terminal device;

selection based on a terminal type of the terminal device; and selection based on an access probability parameter.

In some embodiments, before the terminal device triggers the random access procedure, the above step S210 may be used to select the random access resource(s). For example, the terminal device selects a two-step type random access resource(s) to initiate a random access attempt, or selects a four-step type random access resource(s) to initiate a random access attempt.

The above-mentioned various predefined manners will be described in detail through the following specific embodiments.

Embodiment I

In some embodiments, the terminal device selects a random access resource(s) based on a signal propagation delay or a signal propagation distance. The predefined manners for selecting a random access resource(s) based on the signal propagation delay or the signal propagation distance include at least the following three.

Manner 1 includes the selection based on the RTT acquired by the terminal device;

Manner 2 includes the selection based on the absolute distance of the service link between the terminal device and the serving satellite.

Manner 3 includes the selection based on the delay compensation of the feeder link between the ground station and the serving satellite.

For the transparent-relay type satellite, the entire Uu interface link includes two segments. The first segment is the service link, which refers to the link between the terminal device and the serving satellite. The second segment is the feeder link, which refers to the link between the ground station and the serving satellite. The transparent-relay type satellite does not have signal correction processing capabilities, and can only simply amplify and relay signals.

For the regeneration type satellite, there is only one segment of the entire Uu interface link, that is, the service link between the terminal device and the serving satellite. The regeneration type satellite can not only amplify and relay signals, but also correct and process signals.

Among the above three manners for selecting a random access resource(s), Manner 1 and Manner 2 are applicable to all types of satellites, and Manner 3 is applicable to the transparent-relay type satellites. The above three manners are described in detail below.

Manner 1

In the related art, the RTT duration is mainly used by the terminal device to maintain synchronization with the network device, and the synchronization mechanism is crucial to the resource scheduling process. The RTT value refers to the back-and-forth propagation delay value of signal between the terminal device and the serving cell. For the transparent-relay type satellite, since the network device is usually provided at the ground station, the RTT value is equal to twice the sum of the feeder link delay compensation and the service link delay compensation. For the regeneration type satellite, the RTT value is equal to twice the service link delay compensation. Regardless of the type of satellite, the RTT value can generally reflect information on the distance between the terminal device and the network device. Due to the attenuation characteristics of wireless signals with the propagation distance, the propagation distance information can largely reflect the signal attenuation expectation, so the RTT value can also reflect the signal attenuation expectations to a large extent.

Under the background of the same transmit power, due to the large payload of the 2-step RACH, the probability of the two-step random access attempt being successfully received by the network device is lower than that of the four-step random access attempt. In order to fully take advantages of the 2-step RACH, it generally requires that the 2-step RACH is preferentially used when the signal attenuation is expected to be low (i.e., the signal propagation distance is small). On the contrary, when the signal attenuation is expected to be high (i.e., the signal propagation distance is large), the 4-step RACH is preferentially used.

Based on the above requirement analysis, for Manner 1, this application proposes that the terminal device selects a two-step type random access resource(s) when the RTT acquired by the terminal device is less than or equal to the first threshold. Otherwise, the terminal device selects a four-step type random access resource(s). Further, after selecting the random access resource(s), the terminal device may use the selected random access resource(s) to initiate a random access attempt.

Alternatively, in some other embodiments, the terminal device may select a two-step type random access resource(s) when the acquired RTT is greater than or equal to the first threshold. Otherwise, the terminal device selects a four-step type random access resource(s). Further, after selecting the random access resource(s), the terminal device may use the selected random access resource(s) to initiate a random access attempt.

In some embodiments, the above-mentioned first threshold is sent by the network device to the terminal device, and the terminal device receives the first threshold through a system broadcast message or a dedicated signaling.

For an application scenario where the satellite is of the transparent-relay type, the terminal device may receive the feeder link delay compensation through a system broadcast messages or a dedicated signaling, and calculate the RTT using the feeder link delay compensation and service link delay compensation. For example, the RTT may be acquired by adding the feeder link delay compensation and the service link delay compensation and, then, multiplying the sum by 2.

Alternatively, for an application scenario where the satellite is of the regeneration type, the terminal device may calculate the above-mentioned RTT by using the service link delay compensation. For example, the RTT value is equal to twice the service link delay compensation.

The terminal device may determine the service link delay compensation using the absolute distance of the service link. For example, the terminal device acquires geographic position information of the terminal device and real-time position information of the serving satellite; and determines the absolute distance of the service link according to the geographic position information of the terminal device and the real-time position information of the serving satellite. Usually, the terminal device may acquire its own geographical position information through a positioning module, and acquire the real-time position information of the serving satellite through a cell system broadcast information or ephemeris information. In this way, the terminal device can easily calculate the absolute distance of the service link. The service link delay compensation may be determined by using the absolute distance of the service link and a signal transmission speed. For example, the service link delay compensation may be acquired by dividing the absolute distance of the service link by the signal transmission speed.

The above ephemeris information in some embodiments of this application has a similar meaning to the satellite orbit operation data and ephemeris commonly used in the field of satellite communications. The meaning of the ephemeris is to inform the user of the initial position state vector information of the satellite at a defined starting time point. Usually, the starting time point information is public and does not need to be bound to a certain satellite, and there are six remaining parameters required to represent the satellite orbit operation data, in which the absolute space position vector of the satellite needs to be represented by three parameters, and the space velocity vector of the satellite needs to be represented by three parameters. Then, after acquiring the satellite orbital operation data, theoretically, the spatial position information of the satellite at any point in the future can be accurately calculated and predicted.

As described above, when calculating the RTT value, in addition to the service link delay compensation, the feeder link delay compensation is also required. It is typically difficult to calculate the distance of the feeder link or the feeder link delay compensation. For security reasons, the specific geographic position information of the ground gateway (in which the network device is usually provided) will not be actively provided to the terminal device. Therefore, in some embodiments of this application, the terminal device receives the feeder link delay compensation sent by the network device through a system broadcast message or a dedicated signaling.

It should be emphasized that the feeder link delay compensation proposed by some embodiments of this application may be determined by the network device according to the position of the serving satellite and the position of the network device. Alternatively, the feeder link delay compensation may be determined by the network device according to any time synchronization reference point specified by the serving cell, where the time synchronization reference point includes any point between the serving satellite and the network device. It can be seen that some embodiments of this application propose a more flexible way of determining the feeder link delay compensation, and the value of the feeder link delay compensation determined in the latter way may be less than or equal to that determined in the former way. Accordingly, the RTT value calculated based on the feeder link delay compensation determined in the latter way may be less than or equal to that calculated based on the feeder link delay compensation determined in the former way. The terminal device does not need to perceive this, but only needs to receive the feeder link delay compensation from the network device, calculate the RTT value using the feeder link delay compensation, and select a random access resource(s) according to the RTT value.

Manner 2

Manner 2 is also applicable to all types of satellites. The difference from Manner 1 is that, in Manner 2, which random access type to be used is determined only by acquiring the signal propagation distance information of the service link between the terminal device and the serving satellite, thereby being easier for implementation.

For the transparent-relay type satellite, the entire Uu interface link includes the service link between the terminal device and the serving satellite, and the feeder link between the gateway station and the serving satellite. For the regeneration type satellite, there is only one segment of the entire Uu interface link, that is, the service link between the terminal device and the serving satellite. Regardless of the type of satellite, the absolute distance of the service link can reflect the signal propagation distance of the satellite network to a certain extent. Due to the attenuation characteristics of wireless signals with the propagation distance, the signal propagation distance can largely reflect the signal attenuation expectation, so the absolute distance of the service link can also reflect the signal attenuation expectations to a large extent.

Under the background of the same transmit power, due to the large payload of the 2-step RACH, the probability of the two-step random access attempt being successfully received by the network device is lower than that of the four-step random access attempt. In order to fully take advantages of the 2-step RACH, it generally requires that the 2-step RACH is preferentially used when the signal attenuation is expected to be low (i.e., the signal propagation distance is small). On the contrary, when the signal attenuation is expected to be high (i.e., the signal propagation distance is large), the 4-step RACH is preferentially used.

Based on the above analysis, for Manner 2, this application proposes that the terminal device selects a two-step type random access resource(s) when the absolute distance of the service link is less than or equal to a second threshold. Otherwise, the terminal device selects a four-step type random access resource(s). Further, after selecting the random access resource(s), the terminal device may use the selected random access resource(s) to initiate a random access attempt.

Alternatively, in some other embodiments, the terminal device may select a two-step type random access resource(s) when the absolute distance of the service link is greater than or equal to the second threshold. Otherwise, the terminal device selects a four-step type random access resource(s). Further, after selecting the random access resource(s), the terminal device may use the selected random access resource(s) to initiate a random access attempt.

In some embodiments, the above-mentioned second threshold is sent by the network device to the terminal device, and the terminal device receives the second threshold through a system broadcast message or a dedicated signaling.

The method for determining the absolute distance of the service link by the terminal device may be the same as the corresponding method in the foregoing Manner 1, and details are not repeated herein.

Manner 3

Manner 3 is only applicable to the transparent-relay type satellite. Manner 3 relies on the system broadcast message or dedicated signaling. Because terminal device usually cannot directly calculate and acquire the feeder link delay compensation between the ground station and the serving satellite, a value of the feeder link delay compensation between the ground station and the serving satellite may be typically informed by the network device to the terminal device through the system broadcast message or dedicated signaling.

For the transparent-relay type satellite, the entire Uu interface link includes the service link between the terminal device and the serving satellite, and the feeder link between the gateway station and the serving satellite. For the regeneration type satellite, there is only one segment of the entire Uu interface link, that is, the service link between the terminal device and the serving satellite. Regardless of the type of satellite, the feeder link delay compensation can reflect the signal propagation delay of the satellite network to a certain extent. Due to the attenuation characteristics of wireless signals with the propagation delay, the signal propagation delay can largely reflect the signal attenuation expectation, so the feeder link delay compensation can also reflect the signal attenuation expectations to a large extent.

Under the background of the same transmit power, due to the large payload of the 2-step RACH, the probability of the two-step random access attempt being successfully received by the network device is lower than that of the four-step random access attempt. In order to fully take advantages of the 2-step RACH, it generally requires that the 2-step RACH is preferentially used when the signal attenuation is expected to be low (i.e., the signal propagation delay is small). On the contrary, when the signal attenuation is expected to be high (i.e., the signal propagation delay is large), the 4-step RACH is preferentially used.

Based on the above analysis, for Manner 3, this application proposes that the terminal device selects a two-step type random access resource(s) when the feeder link delay compensation is less than or equal to a third threshold. Otherwise, the terminal device selects a four-step type random access resource(s). Further, after selecting the random access resource(s), the terminal device may use the selected random access resource(s) to initiate a random access attempt.

Alternatively, in some other embodiments, the terminal device may select a two-step type random access resource(s) when the feeder link delay compensation is greater than or equal to the third threshold. Otherwise, the terminal device selects a four-step type random access resource(s). Further, after selecting the random access resource(s), the terminal device may use the selected random access resource(s) to initiate a random access attempt.

In some embodiments, the above-mentioned third threshold is sent by the network device to the terminal device, and the terminal device receives the second threshold through a system broadcast message or a dedicated signaling.

Similar to the description in the above Manner 1, some embodiments of this application propose a more flexible way of determining the feeder link delay compensation. As proposed in this application, the feeder link delay compensation can be determined by the network device according to the position of the serving satellite and the position of the network device. Alternatively, the feeder link delay compensation can be determined by the network device according to any time synchronization reference point specified by the serving cell, where the time synchronization reference point includes any point between the serving satellite and the network device. The terminal device does not need to perceive this, but only needs to receive the feeder link delay compensation from the network device, and select a random access resource(s) accordingly.

The three manners for selecting a random access resource(s) as described in the foregoing Manner 1 to Manner 3 may be used independently or in combination, which is not limited in this application.

In addition, the three manners for selecting a random access resource(s) in the foregoing Manner 1 to Manner 3 can be used for the terminal device to determine the random access resource(s) before the initial random access attempt of any random access procedure, or for the terminal device to determine the random access resource(s) before each random access attempt in the random access procedure.

In some embodiments, the three manners for selecting a random access resource(s) in the foregoing Manner 1 to Manner 3 may also be used in combination with the measurement results of the target cell or the serving cell.

For example, before the terminal device applies the above-mentioned predefined manners (such as Manner 1 to Manner 3), it may further include following content.

The terminal device determines whether a measurement result of the target cell or the serving cell is greater than or equal to a fourth threshold, and if yes, performs the step of selecting the random access resource(s) by the terminal device based on at least one predefined manner (such as Manner 1 to Manner 3); otherwise, the terminal device selects a four-step type random access resource(s).

Alternatively, before the terminal device applies the above-mentioned predefined manners (such as Manner 1 to Manner 3), it may further following content.

The terminal device determines whether a measurement result of the target cell or the serving cell is greater than or equal to the fourth threshold. If yes, the terminal device selects a four-step type random access resource(s); otherwise, the terminal device performs the step of selecting the random access resource(s) based on at least one predefined manner.

Embodiment II

In some embodiments, a predefined Manner 4 is proposed, in which the terminal device selects a random access resource(s) based on the service identity information that triggers the random access procedure.

In some embodiments, the service identity information includes at least one of the following identities:

- an Access Category (AC) identity that triggers the terminal to initiate the random access procedure;
- an access Cause Value identity that triggers the terminal to initiate the random access procedure;
- a terminal type identity (UE Identity) that triggers the terminal to initiate the random access procedure.

Information on the at least one service identity described above may be predefined in the protocol, for example, 64 types of ACs are defined in the existing protocol, numbered 0 to 63 respectively. The protocol defines the corresponding relationship between respective AC values and one service or a group of services; and each AC corresponds to one Cause Value identity, where the mapping relationship therebetween is specified in the protocol. The protocol also specifies several UE Identities, and whenever a service is triggered by the non-access stratum (NAS) or the access stratum (AS), the AS may acquire, from the NAS or the AS itself, the information including AC, Cause Value, and UE Identity related to the service, and perform access control based on this information.

Based on the above technologies, a predefined identity, such as a predefined AC, Cause Value or UE Identity, may be specified in advance according to some embodiments of this application. When the service related to the predefined identity is triggered, the terminal device selects a two-step type random access resource(s) to initiate the random access attempt. Otherwise, the terminal device selects a four-step type random access resource(s) to initiate the random access attempt.

Manner 4 can be used for the terminal device to determine the random access resource(s) before the initial random access attempt of any random access procedure, or for the terminal device to determine the random access resource(s) before each random access attempt of any random access procedure.

In this way, when triggering the random access procedure, the terminal device acquires the service identity information that triggers the random access procedure, and selects the corresponding random access resource(s) according to the service identity information, so as to flexibly perform selection between the two-step type random access resource(s) and four-step type random access resource(s), thereby improving the utilization of random access resource(s).

In some embodiments, Manner 4 may also be used in combination with the measurement result of the target cell or the serving cell.

For example, before the terminal device selects the random access resource(s) by applying Manner 4, it may further include following content.

The terminal device determines whether the measurement result of the target cell or the serving cell is greater than or equal to the fourth threshold, and if yes, performs the step of selecting a random access resource(s) by the terminal device based on Manner 4. Otherwise, the terminal device selects a four-step type a random access resource(s).

Alternatively, before the terminal device selects the random access resource(s) by applying Manner 4, it may further include following content.

The terminal device determines whether the measurement result of the target cell or the serving cell is greater than or equal to the fourth threshold. If yes, the terminal device selects the four-step type random access resource(s). Otherwise, the terminal device selects a random access resource(s) based on Manner 4.

Optionally, this application does not limit the method used in any combination of Manner 4 and Manner 1 to Manner 3.

Embodiment III

In some embodiments, a predefined Manner 5 is proposed, in which the terminal device selects a random access resource(s) based on its own terminal type, including the following processes:

- the terminal device determines the terminal type of the terminal device; and
- in response to the terminal type of the terminal device being a preset type, the terminal device selects a two-step type random access resource; and otherwise, the terminal device selects a four-step type random access resource.

The above-mentioned preset type may be pre-specified in some embodiments of this application. After the terminal device determines its own terminal type, it determines whether the terminal type belongs to the preset type. If yea, it selects a two-step type random access resource(s) to initiate a random access attempt; otherwise, it selects a four-step type random access resource(s) to initiate the random access attempt.

In some embodiments, the terminal device may determine the terminal type of the terminal device in at least one of the following manners:

- acquiring a predefined terminal type of the terminal device; for example, its terminal type identity is set when it leaves the factory;
- acquiring the terminal type of the terminal device through a NAS procedure; and determining the terminal type of the terminal device according to capability information of the terminal device.

The protocol may directly specify several terminal types of terminals, and various capabilities supported by the terminals may be considered for the division of terminal types. Capability information of at least one of the following dimensions of the terminal device may generally be considered when classifying the terminal types:

1) a maximum transmit power level supported by the terminal device;
2) an application scenario supported by the terminal device, such as satellite communication scenario, terrestrial communication scenario, and delay-sensitive scenario;
3) a dual connectivity (DC) capability and/or a carrier aggregation (CA) capability supported by the terminal device;
4) a bandwidth aggregation capability supported by the terminal device;
5) a bandwidth size supported by the terminal device;
6) whether the terminal device receives services in an operator network subscribed by the terminal device;
7) a number of transmitting antennas and/or a number of receiving antennas supported by the terminal device;
8) a radio access technology (RAT) type supported by the terminal device.

Under a classification rule, several terminal types are divided only according to the number of transmitting antennas and/or the number of receiving antennas supported by the terminal device. For example, the terminal type of a terminal device with one transmit antenna and one receiving antenna is type 1; the terminal type of a terminal device with one transmit antenna and two receiving antennas is type 2; the terminal type of a terminal device with one transmit antenna and four or more receiving antennas is type 3; and the terminal type of a terminal device with two or more transmit antennas is type 4.

Under another classification rule, two or more dimensions may be considered at the same time for the classification of terminal types. For example, the terminal type of a terminal device supporting a maximum transmit power of P1 and a minimum bandwidth of B1 is type 1, and the terminal type of a terminal device supporting a maximum transmit power of P2 and a minimum bandwidth of B2 is type 2.

The principle of dividing the terminal types in other dimensions is similar to the above example, and will not be repeated here.

According to the above method of determining the terminal type, the terminal types of terminal devices may be predefined according to the capability information of the terminal devices in advance, and stored in a terminal device; when the terminal device performs random access, the terminal device can use the pre-stored terminal types to select a random access resource(s) and initiate a random access attempt.

Alternatively, the network device determines the terminal type of the terminal device according to the capability information of the terminal device and/or local policy information of the network device. The terminal device acquires its own terminal type from the network device through the NAS procedure, and uses the terminal type to select a random access resource(s) and initiate a random access attempt.

Alternatively, the terminal device determines its own terminal type according to its own capability information, and uses the terminal type to select a random access resource(s) and initiate a random access attempt.

Manner 5 can be used for the terminal device to determine the random access resource(s) before the initial random access attempt of any random access procedure, or for the terminal device to determine the random access resource(s) before each random access attempt of any random access procedure.

In some embodiments, Manner 5 may also be used in combination with the measurement result of the target cell or the serving cell.

For example, before the terminal device selects the random access resource(s) by applying Manner 5, it may further following content.

The terminal device determines whether the measurement result of the target cell or the serving cell is greater than or equal to the fourth threshold, and if yes, performs the step of selecting a random access resource(s) by the terminal device based on Manner 5. Otherwise, the terminal device selects a four-step type a random access resource(s).

Alternatively, before the terminal device selects the random access resource(s) by applying Manner 5, it may further include following content.

The terminal device determines whether the measurement result of the target cell or the serving cell is greater than or equal to the fourth threshold, and if yes, the terminal device selects a four-step type random access resource(s) to initiate a random access attempt. Otherwise, the terminal device selects a random access resource(s) based on Manner 5 to initiate the random access attempts.

Optionally, this application does not limit the method used in any combination of Manner 5 and Manner 1 to Manner 4.

Embodiment IV

In some embodiments, a predefined Manner 6 is proposed, in which the terminal device selects a random access resource(s) based on an access probability parameter. In some embodiments, the network device may configure random access resource selection probability configuration information to the terminal device through a system broadcast message or dedicated signaling, where the random access resource selection probability configuration information may include the access probability parameter; and the terminal device selects a corresponding random access resource(s) based on the access probability parameter and a random number generated by itself.

In some embodiments, Manner 6 may include the following process:

the terminal device generates a random number; and in response to the random number falling within a value range specified by the access probability parameter, the terminal device selects a two-step type random access resource(s); otherwise, the terminal device selects a four-step type random access resource(s).

For example, the access probability parameter specifies that the probability that the terminal device selects the two-step random access resource(s) to initiate a random access attempt is 0.6, which means that each time the selection process is triggered, the terminal device has a probability of 60% to select the two-step random access resource(s) to initiate a random access attempt. The final selection result depends on the random number generated by the terminal itself. If the value of the generated random number falls within the probability range defined by 60%, the terminal device selects the two-step random access resource(s) to initiate a random access attempt; otherwise, the terminal device selects the four-step random access resource(s) to initiate a random access attempt.

Alternatively, Manner 6 may include the following process:

the terminal device generates a random number;

in response to the random number falling within a value range specified by the access probability parameter, the terminal device selects a four-step type random access resource(s); otherwise, the terminal device selects a two-step type random access resource(s).

For example, the access probability parameter specifies that the probability that the terminal device selects the four-step random access resource(s) to initiate a random access attempt is 0.3, which means that each time the selection process is triggered, the terminal device has a probability of 30% to select the four-step random access resource(s) to initiate a random access attempt. The final selection result depends on the random number generated by the terminal itself. If the value of the generated random number falls within the probability range defined by 30%, the terminal device selects the four-step random access resource(s) to initiate a random access attempt; otherwise, the terminal device selects the two-step random access resource(s) to initiate a random access attempt.

Manner 6 can be used for the terminal device to determine the random access resource(s) before the initial random access attempt of any random access procedure, or for the terminal device to determine the random access resource(s) before each random access attempt of any random access procedure.

Since each terminal device in the system randomly generates random numbers, the random numbers generated by all terminal devices will be evenly distributed. Accordingly, each terminal device randomly performs selection between the two-step random access resource(s) and four-step random access resource(s) according to the access probability parameter as received and the random number generated by itself, the ratio of terminal devices that select two-step random access resource(s) and that select the four-step random access resource(s) in the system can be consistent with the ratio specified by the access probability parameter.

In some embodiments, Manner 6 may also be used in combination with the measurement result of the target cell or the serving cell.

For example, before the terminal device selects the random access resource(s) by applying Manner 6, it may further following content.

The terminal device determines whether the measurement result of the target cell or the serving cell is greater than or equal to the fourth threshold, and if yes, performs the step of selecting a random access resource(s) by the terminal device based on Manner 6. Otherwise, the terminal device selects a four-step type a random access resource(s).

Alternatively, before the terminal device selects the random access resource(s) by applying Manner 6, it may further include following content.

The terminal device determines whether the measurement result of the target cell or the serving cell is greater than or equal to the fourth threshold. If yes, the terminal device selects the four-step type random access resource(s). Otherwise, the terminal device selects a random access resource(s) based on Manner 6.

Optionally, this application does not limit the method used in any combination of Manner 4 and Manner 1 to Manner 3.

Embodiment V

When the above Manner 1 to Manner 6 are used in combination with the measurement result of the target cell or the serving cell, the cell measurement result may be cell-level or beam-level measurement result, and the measurement result may include at least one of a reference signal received power (RSRP), a reference signal received quality (RSRQ), or a signal to interference plus noise ratio (SINR).

For example, when the fourth threshold configured by the network device is an RSRP-based threshold, the terminal device may compare a measured RSRP measurement result of the target cell or serving cell with an RSRP threshold configured by the network device. When the RSRP measurement result of the target cell or serving cell is higher than the fourth threshold, the terminal device selects a random access resource(s) based on a rule corresponding to the above-mentioned predefined manner (such as at least one of Manner 1 to Manner 6). Otherwise, when the RSRP measurement result of the target cell or serving cell is lower than or equal to the fourth threshold, the terminal device selects a four-step type random access resource(s) to initiate an initial random access attempt. Alternatively, for another example, when the RSRP measurement result of the target cell or serving cell is higher than the fourth threshold, the terminal device selects the four-step type random access resource(s) to initiate an initial random access attempt. Otherwise, when the RSRP measurement result of the target cell or serving cell is lower than or equal to the fourth threshold, the terminal device selects a random access resource(s) based on a rule corresponding to the above-mentioned predefined manner (such as at least one of Manner 1 to Manner 6).

In some embodiments, the network device may notify the terminal device of the above-mentioned fourth threshold, and the terminal device receives the fourth threshold through a system broadcast message or dedicated signaling.

Embodiment VI

When there are at least two predefined manners, the network device may notify the terminal device which predefined manner is to be used for selecting a random access resource(s). In some embodiments, the network device may indicate through predefined manner indication information, and the terminal device receives the predefined manner indication information through a system broadcast message or dedicated signaling, determines a predefined manner used for selecting the random access resource(s) according to the predefined manner indication information, and then selects a random access resource(s) using the determined predefined manner to initiate a random access attempt.

The above-mentioned predefined manner indication information may be in the form of a bit mapping mode or a bit combination valuing mode.

When the predefined manner indication information adopts the bit mapping mode, for example, if three predefined manners are defined, the length of the predefined manner indication information may be 3 bits, and each bit corresponds to one predefined manner. When the network device is to activate one of the predefined manners, a value of the bit corresponding to this predefined manner in the predefined manner indication information is set to '1', and values of the other bits are set to '0'. According to the predefined manner indication information as received, the terminal device selects the random access resource(s) in the manner indicated by the predefined manner indication information. When the predefined manner indication information does not exist, the terminal device may select the random access resource(s) in a default mode according to the protocol. The above example of the meaning of the bit mapping mode may also be extended to other predefined manners, which will not be repeated here.

When the predefined manner indication information adopts the bit combination valuing mode, for example, if four predefined manners are defined, the length of the predefined manner indication information may be 2 bits, and the two bit combination values have 4 possibilities, including '00', '01', '10', and '11', with each of which corresponding to one predefined manner. When the network device is to activate one of the predefined manners, the value of the predefined manner indication information is set to a value corresponding to the predefined manner agreed in the protocol. According to the predefined manner indication information as received, the terminal device selects the random access resource(s) in the manner indicated by the predefined manner indication information. When the predefined manner indication information does not exist, the terminal device may select the random access resource(s) in a default mode according to the protocol. The above example of the meaning of the bit combination valuing mode may also be extended to other predefined manners, which will not be repeated here.

Embodiment VII

In some embodiments, the random access resource(s) may include at least one piece of the following configuration information:

- a random access occasion (RO) resource configuration for the terminal device to initiate a random access attempt;
- a random access preamble resource configuration for the terminal device to initiate the random access attempt; and
- a time backoff parameter and a power ramping parameter configured for controlling behavior of the terminal device after a failed random access attempt.

In some embodiments, the RO resource configuration for the terminal device to initiate the random access attempt and/or the random access preamble resource configuration for the terminal device to initiate the random access attempt is associated with a synchronization signal block (SSB) configuration or independent of the SSB configuration.

In some embodiments, the time backoff parameter configured for controlling the behavior of the terminal device after the failed random access attempt specifies a minimum time interval, in a single random access procedure, between the failed random access attempt and initiation of a next random access attempt. The time backoff parameter can be used to prevent the terminal device from frequently initiating random access attempts.

In some embodiments, the power ramping parameter specifies power increase amount information, in a single random access procedure, for initiating a next random access attempt after the failed random access attempt.

There are at least the following two ways to use the power ramping parameter.

As to the first way, after the failed random access attempt, a transmit power for initiating the next random access attempt is made be equal to a sum of a transmit power corresponding to a previous random access attempt and an increment specified by the power ramping parameter.

In this way, there is no need to judge whether the SSB index of the two selections to initiate random access attempts has changed. In other words, whether or not the SSB index has changed, the latter random access attempt is always performed by increasing the increment specified by the power ramping parameter based on the transmit power of the previous random access attempt.

As to the second way, in response to SSB indexes of two consecutive random access attempts being different, after the failed random access attempt, a transmit power for initiating the next random access attempt is made be equal to a sum of a transmit power corresponding to a previous random access attempt and an increment specified by the power ramping parameter. Otherwise, in response to the SSB indexes of the two consecutive random access attempts being the same, after the failed random access attempt, the transmit power for initiating the next random access attempt is made be equal to the transmit power corresponding to the previous random access attempt.

In this way, it is necessary to judge whether the SSB index has changed between the two consecutive random access attempts; and only when it has changed, the latter random access attempt is performed by increasing the increment specified by the power ramping parameter based on the transmit power of the previous random access attempt.

Compared with the second way, the above-mentioned first way is more flexible in using the power ramping parameter.

A variety of manners for selecting the random access resource(s) have been introduced above. With the above manners, the terminal device can select the random access resource(s) more flexibly, and perform more reasonable selection between the two-step random access resource(s) and four-step random access resource(s), thereby improving the utilization of random access resource(s). The above multiple predetermined manners can be used separately or in combination. In addition, the application scenarios of the above manners are flexible, and can be applied to the random access resource(s) determination of the terminal device in the initial random access attempt of any random access procedure, and can also be used for the random access resource(s) determination of the terminal device in each random access attempt of any random access procedure. The above method for selecting the random access resource(s) is especially suitable for the selection of random access resource(s) by terminal device in the satellite network.

Some embodiments of this application further proposes a method for selecting a random access resource(s). FIG. 3 is a schematic flowchart of a method 300 for selecting a random access resource(s) according to some embodiments of this application. The method may optionally be applied to the system shown in FIG. 1, but is not limited thereto. The method includes at least some of the following.

In S310, the network device sends the feeder link delay compensation to the terminal device through a system broadcast message or dedicated signaling, where the feeder link delay compensation is configured for the terminal device to select the random access resource.

The feeder link delay compensation sent by the network device to the terminal device can be used for the terminal device to calculate the signal propagation delay (such as RTT), and select a corresponding random access resource(s) based on a comparison result between the RTT or feeder link delay compensation and a corresponding threshold value.

Optionally, the feeder link delay compensation is determined by the network device according to a position of a serving satellite and a position of the network device; or, the feeder link delay compensation is determined by the network device according to a time synchronization reference point specified by the serving cell, where the time synchronization reference point includes any point between the serving satellite and the network device. This way of determining the feeder link delay compensation is relatively flexible, and the terminal device does not need to perceive it, but only needs to select a random access resource(s) and initiate a random access attempt by using the feeder link delay compensation sent by the network device through the system broadcast messages or dedicated signaling; or only needs to calculate the RTT by using the feeder link delay compensation sent by the network device, and select a random access resource(s) and initiate a random access attempt by using the RTT value.

Optionally, the above method may also include:

sending, by the network device, ephemeris information or real-time position information of a serving satellite, which is configured for the terminal device to select the random access resource, to the terminal device through a system broadcast message.

The real-time position information or ephemeris information of the serving satellite sent by the network device can be used by the terminal device to calculate the absolute distance of the service link in combination with its own geographic position information. Alternatively, the absolute distance of the service link may be further used, with the feeder link delay compensation, to calculate the signal propagation delay (e.g., RTT). Then the corresponding random access resource(s) may be selected according to a comparison result between the RTT or the absolute distance of the service link and a corresponding threshold.

Optionally, the above method may also include:

sending, by the network device, a terminal type of the terminal device, which is configured for the terminal device to select the random access resource, to the terminal device through a NAS procedure.

In some embodiments, random access resources corresponding to different terminal types may be predefined. When the terminal device receives its own terminal type, it selects a corresponding random access resource(s) according to the received terminal type to initiate the random access attempt.

Optionally, the above method may also include:

sending, by the network device, an access probability parameter, which is configured for the terminal device to select the random access resource, to the terminal device through a system broadcast message or a dedicated signaling.

The terminal device can select a corresponding random access resource(s) to initiate a random access attempt according to the received access probability parameter and a random number generated by itself. The specific selection method has been introduced in the above embodiments, and will not be repeated here.

Optionally, the above method may also include:

sending, by the network device, a first threshold, a second threshold, a third threshold or a fourth threshold, which is configured for the terminal device to select the random access resource, to the terminal device through a system broadcast message or a dedicated signaling.

The usage methods of the above-mentioned first threshold, second threshold, third threshold and fourth threshold have been introduced in the above-mentioned embodiments, and will not be repeated here.

Optionally, the above method may also include:

sending, by the network device, predefined manner indication information, which is configured for indicating the terminal device to determine a predefined manner for selecting the random access resource, to the terminal device through a system broadcast message or a dedicated signaling.

Optionally, the above process of selecting the random access resource(s) can be used by the terminal device to determine a random access resource(s) before an initial random access attempt of any random access procedure, or the above process of selecting the random access resource(s) can be used the terminal device to determine a random access resource(s) before each random access attempt of any random access procedure.

Optionally, the above random access resource(s) includes at least one of the following configuration information:

RO resource configuration for the terminal device to initiate a random access attempt;

a random access preamble resource configuration for the terminal device to initiate the random access attempt;

a time backoff parameter and a power ramping parameter configured for controlling behavior of the terminal device after a failed random access attempt.

Optionally, the RO resource configuration for the terminal device to initiate the random access attempt and/or the random access preamble resource configuration for the terminal device to initiate the random access attempt is associated with an SSB configuration or independent of the SSB configuration.

Optionally, the time backoff parameter configured for controlling the behavior of the terminal device after the failed random access attempt specifies a minimum time interval, in a single random access procedure, between the failed random access attempt and initiation of a next random access attempt.

Optionally, the power ramping parameter specifies power increase amount information, in a single random access procedure, for initiating a next random access attempt after the failed random access attempt.

The specific settings and implementations of some embodiments of this application have been described above through multiple embodiments from different perspectives. Using at least one of the above embodiments, the network device sends the feeder link delay compensation to the terminal device through a system broadcast message or dedicated signaling, or further sends other related information, which can be used by the terminal device to select a random access resource(s), so as to enable the terminal device to select a random access resource(s). The terminal device can flexibly and reasonably select the two-step random access resource(s) or the four-step random access resource(s), thereby improving the utilization rate of the random access resource(s).

Corresponding to the processing method of at least one embodiment above, some embodiments of this application further provide a terminal device. FIG. 4 is a block diagram of a terminal device 400 according to some embodiments of this application, including:

a selecting module 410, configured to select a random access resource based on at least one of predefined manners, wherein the predefined manners include:

selection based on an RTT acquired by the terminal device;

selection based on an absolute distance of a service link;

selection based on a delay compensation of a feeder link;

selection based on service identity information for triggering a random access procedure by the terminal device;

selection based on a terminal type of the terminal device; and selection based on an access probability parameter.

Optionally, the selecting module 410 is configured to:

in response to the RTT acquired by the terminal device being less than or equal to a first threshold, select a two-step type random access resource; and otherwise, select a four-step type random access resource.

Optionally, the selecting module 410 is configured to:

in response to the RTT acquired by the terminal device being greater than or equal to a first threshold, select a two-step type random access resource; and otherwise, select a four-step type random access resource.

Figure 5:
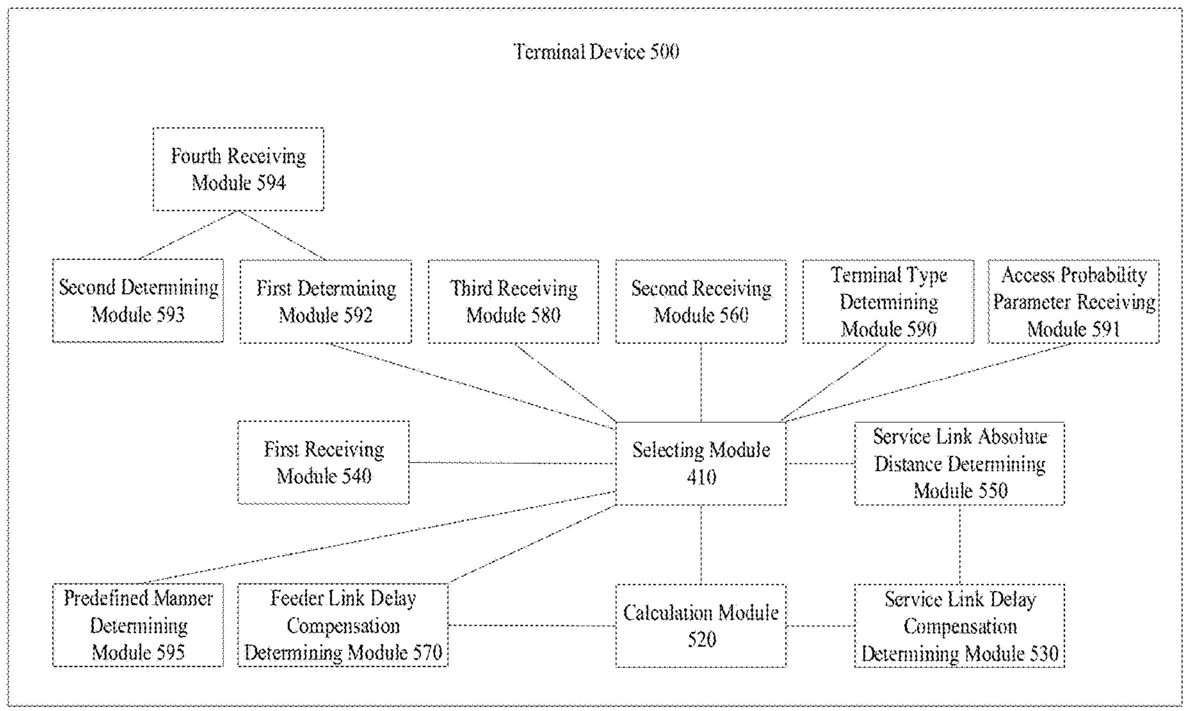
FIG. 5 is a block diagram of a terminal device 500 according to some embodiments of this application.

Some embodiments of this application further provide a terminal device. FIG. 5 is a block diagram of a terminal device 500 according to some embodiments of this application. The terminal device 500 includes a selecting module 410 and further includes:

a calculation module 520, configured to receive the delay compensation of the feeder link through a system broadcast message or a dedicated signaling, and calculate the RTT based on the delay compensation of the feeder link and a delay compensation of the service link; or, calculate the RTT based on the delay compensation of the service link.

As shown in FIG. 5, optionally, the terminal device 500 may further include:

a service link delay compensation determining module 530, configured to determine the delay compensation of the service link based on the absolute distance of the service link.

As shown in FIG. 5, optionally, the terminal device 500 may further include:

a first receiving module 540, configured to receive the first threshold through a system broadcast message or dedicated signaling.

Optionally, the selecting module 410 is configured to:

in response to the absolute distance of the service link being less than or equal to a second threshold, select a two-step type random access resource; and otherwise, select a four-step type random access resource.

Optionally, the selecting module 410 is configured to:

in response to the absolute distance of the service link being greater than or equal to a second threshold, select a two-step type random access resource; and otherwise, select a four-step type random access resource.

As shown in FIG. 5, optionally, the terminal device 500 may further include:

a service link absolute distance determining module 550, configured to acquire geographic position information of the terminal device and real-time position information of a serving satellite; and determine the absolute distance of the service link according to the geographic position information of the terminal device and the real-time position information of the serving satellite.

Optionally, the absolute distance determining module 550 is configured to acquire the real-time position information of the serving satellite through a system broadcast message or ephemeris information.

As shown in FIG. 5, optionally, the terminal device 500 may further include:

a second receiving module 560, configured to receive the second threshold through a system broadcast message or dedicated signaling.

Optionally, the selecting module 410 is configured to:

in response to the delay compensation of the feeder link being less than or equal to a third threshold, select a two-step type random access resource; and otherwise, select a four-step type random access resource.

Optionally, the selecting module 410 is configured to:

in response to the delay compensation of the feeder link being greater than or equal to a third threshold, select a two-step type random access resource; and otherwise, select a four-step type random access resource.

As shown in FIG. 5, optionally, the terminal device 500 may further include:

a feeder link delay compensation receiving module 570, configured to receive the feeder link delay compensation through a system broadcast message or dedicated signaling.

Optionally, the delay compensation of the feeder link is determined by a network device according to a position of a serving satellite and a position of the network device; or, the delay compensation of the feeder link is determined by the network device according to a time synchronization reference point specified by the serving cell, wherein the time synchronization reference point comprises a point between the serving satellite and the network device.

As shown in FIG. 5, optionally, the terminal device 500 may further include:

a third receiving module 580, configured to receive the third threshold through a system broadcast message or dedicated signaling.

Optionally, the selecting module 410 is configured to:

acquire the service identity information for triggering the random access procedure; and in response to the service identity information being a predefined identity, select a two-step type random access resource; and otherwise, select a four-step type Random access resource.

Optionally, the service identity information includes at least one of the following:

an access category (AC) identity;

an access cause value identity;

a terminal type identity.

Optionally, the selecting module 410 is configured to:

determine the terminal type of the terminal device; and in response to the terminal type of the terminal device being a preset type, select a two-step type random access resource; and otherwise, select a four-step type random access resource.

As shown in FIG. 5, optionally, the terminal device 500 may further include:

a terminal type determining module 590, configured to determine the terminal type of the terminal device in at least one of the following manners:

acquiring a predefined terminal type of the terminal device; for example, its terminal type identity is set when it leaves the factory;

acquiring the terminal type of the terminal device through a NAS procedure;

determining the terminal type of the terminal device according to capability information of the terminal device.

Optionally, the capability information of the terminal device includes at least one of the following:

a maximum transmit power level supported by the terminal device;

an application scenario supported by the terminal device;

a DC capability and/or a CA capability supported by the terminal device;

a bandwidth aggregation capability supported by the terminal device;

a bandwidth size supported by the terminal device;

whether the terminal device receives services in an operator network subscribed by the terminal device;

a number of transmitting antennas and/or a number of receiving antennas supported by the terminal device;

an RAT type supported by the terminal device.

Optionally, the application scenarios supported by the terminal device include at least one of the following:

a satellite communication scenario;

a ground communication scenario;

a delay-sensitive scenario.

Optionally, the selecting module 410 is configured to:

generate a random number; and in response to the random number falling within a value range specified by the access probability parameter, select a two-step type random access resource; and otherwise, select a four-step type random access resource.

Optionally, the selecting module 410 is configured to:

generate a random number; and in response to the random number falling within a value range specified by the access probability parameter, select a four-step type random access resource; and otherwise, select a two-step type random access resource.

As shown in FIG. 5, optionally, the terminal device 500 may further include:

an access probability parameter receiving module 591, configured to receive the access probability parameter through a system broadcast message or dedicated signaling.

As shown in FIG. 5, optionally, the terminal device 500 may further include:

a first determining module 592, configured to determine whether a measurement result of a target cell or a serving cell is greater than or equal to a fourth threshold; and if yes, perform said selecting the random access resource based on the at least one of predefined manners; and otherwise, select a four-step type random access resource.

As shown in FIG. 5, optionally, the terminal device 500 may further include:

a second determining module 593, configured to determine whether a measurement result of a target cell or a serving cell is greater than or equal to a fourth threshold; and if yes, select a four-step type random access resource; and otherwise, perform said selecting the random access resource based on the at least one of predefined manners.

Optionally, the measurement result is a cell-level or beam-level measurement result; and the measurement result includes at least one of RSRP, RSRQ, and SINR.

As shown in FIG. 5, optionally, the terminal device 500 may further include:

a fourth receiving module 594, configured to receive the fourth threshold through a system broadcast message or dedicated signaling.

Optionally, the above process of selecting a random access resource(s) is used for the terminal device to determine a random access resource before an initial random access attempt of any random access procedure; or, said selecting the random access resource is used for the terminal device to determine a random access resource before each random access attempt of any random access procedure.

As shown in FIG. 5, optionally, the terminal device 500 may further include:

a predefined manner determining module 595, configured to receive predefined manner indication information through a system broadcast message or a dedicated signaling, and determine, according to the predefined manner indication information, a predefined manner for selecting the random access resource.

Optionally, the random access resource(s) includes at least one of the following configuration information:

RO resource configuration for the terminal device to initiate a random access attempt;

a random access preamble resource configuration for the terminal device to initiate the random access attempt;

a time backoff parameter and a power ramping parameter configured for controlling behavior of the terminal device after a failed random access attempt.

Optionally, the RO resource configuration for the terminal device to initiate the random access attempt and/or the random access preamble resource configuration for the terminal device to initiate the random access attempt is associated with an SSB configuration or independent of the SSB configuration.

Optionally, the time backoff parameter configured for controlling the behavior of the terminal device after the failed random access attempt specifies a minimum time interval, in a single random access procedure, between the failed random access attempt and initiation of a next random access attempt.

Optionally, the power ramping parameter specifies power increase amount information, in a single random access procedure, for initiating a next random access attempt after the failed random access attempt.

Optionally, a manner for using the power ramping parameter includes:

after the failed random access attempt, making a transmit power for initiating the next random access attempt equal to a sum of a transmit power corresponding to a previous random access attempt and an increment specified by the power ramping parameter.

Optionally, a manner for using the power ramping parameter includes:

in response to SSB indexes of two consecutive random access attempts being different: after the failed random access attempt, making a transmit power for initiating the next random access attempt equal to a sum of a transmit power corresponding to a previous random access attempt and an increment specified by the power ramping parameter; and in response to the SSB indexes of the two consecutive random access attempts being the same: after the failed random access attempt, making the transmit power for initiating the next random access attempt equal to the transmit power corresponding to the previous random access attempt.

It should be understood that the above and other operations and/or functions of the modules in the terminal device according to some embodiments of this application are respectively configured to implement the corresponding process of the terminal device in the method 200 of FIG. 2, and are not repeated here for brevity.

Figure 6:
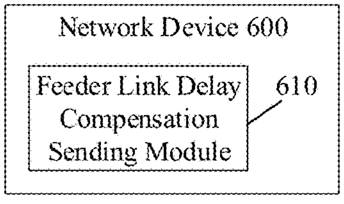
FIG. 6 is a block diagram of a network device 600 according to some embodiments of this application.

Some embodiments of this application further provide a network device. FIG. 6 is a block diagram of a network device 600 according to some embodiments of this application, including:

a feeder link delay compensation sending module 610, configured to send a delay compensation of a feeder link, which is configured for the terminal device to select a random access resource, to a terminal device through a system broadcast message or a dedicated signaling.

Optionally, the delay compensation of the feeder link is determined by the network device according to a position of a serving satellite and a position of the network device; or, the delay compensation of the feeder link is determined by the network device according to a time synchronization reference point specified by the serving cell, wherein the time synchronization reference point comprises a point between the serving satellite and the network device.

Figure 7:
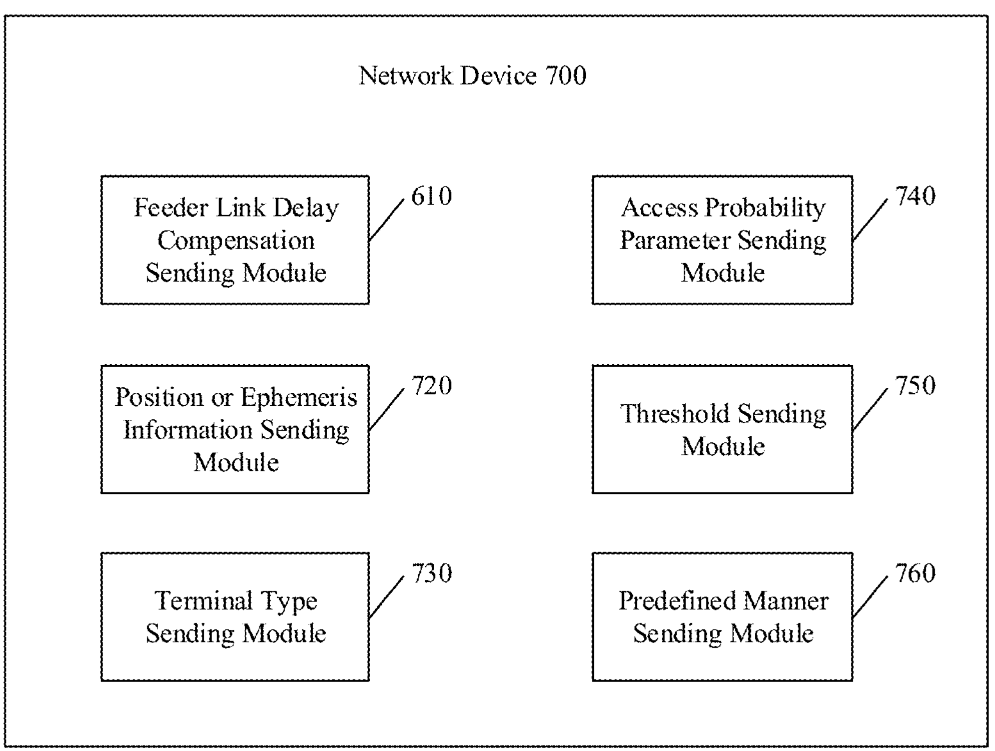
FIG. 7 is a block diagram of a network device 700 according to some embodiments of this application.

Some embodiments of this application also provide a network device. FIG. 7 is a block diagram of a network device 700 according to some embodiments of this application. The network device 700 includes a feeder link delay compensation sending module 610, and further includes:

a position or ephemeris information sending module 720, configured to send ephemeris information or real-time position information of a serving satellite, which is configured for the terminal device to select the random access resource, to the terminal device through a system broadcast message.

As shown in FIG. 7, optionally, the network device 700 may further include:

a terminal type sending module 730, configured to send a terminal type of the terminal device to the terminal device through a NAS procedure, wherein the terminal type is configured for the terminal device to select the random access resource.

As shown in FIG. 7, optionally, the network device 700 may further include:

an access probability parameter sending module 740, configured to send an access probability parameter to the terminal device through a system broadcast message or a dedicated signaling, wherein the access probability parameter is configured for the terminal device to select the random access resource.

As shown in FIG. 7, optionally, the network device 700 may further include:

a threshold sending module 750, configured to send a first threshold, a second threshold, a third threshold or a fourth threshold, which is configured for the terminal device to select the random access resource, to the terminal device through a system broadcast message or a dedicated signaling.

As shown in FIG. 7, optionally, the network device 700 may further include:

a predefined manner sending module 760, configured to send predefined manner indication information, which is configured for indicating the terminal device to determine a predefined manner for selecting the random access resource, to the terminal device through a system broadcast message or a dedicated signaling.

Optionally, the above process of selecting a random access resource(s) is used for the terminal device to determine a random access resource before an initial random access attempt of any random access procedure; or, said select the random access resource is used for the terminal device to determine a random access resource before each random access attempt of any random access procedure.

Optionally, the random access resource(s) includes at least one of the following configuration information:

(RO resource configuration for the terminal device to initiate a random access attempt;

a random access preamble resource configuration for the terminal device to initiate the random access attempt;

a time backoff parameter and a power ramping parameter configured for controlling behavior of the terminal device after a failed random access attempt.

Optionally, the RO resource configuration for the terminal device to initiate the random access attempt and/or the random access preamble resource configuration for the terminal device to initiate the random access attempt is associated with an SSB configuration or independent of the SSB configuration.

Optionally, the time backoff parameter configured for controlling the behavior of the terminal device after the failed random access attempt specifies a minimum time interval, in a single random access procedure, between the failed random access attempt and initiation of a next random access attempt.

Optionally, the power ramping parameter specifies power increase amount information, in a single random access procedure, for initiating a next random access attempt after the failed random access attempt.

It should be understood that the above and other operations and/or functions of the modules in the network device according to some embodiments of this application are respectively configured to implement the corresponding flow of the network device in the method 300 of FIG. 3, and are not repeated here for brevity.

It should be noted that the functions described by the respective modules (submodules, units or components, etc.) in the terminal device 400, the terminal device 500, the network device 600, and the network device 700 in some embodiments of this application may be described by different modules (submodules, units or components, etc.), or can be realized by a single module (sub-module, unit or component, etc.). For example, the first receiving module and the second receiving module may be different modules, or the same module, all of which can achieve their corresponding functions in some embodiments of this application. In addition, the sending module and the receiving module in some embodiments of this application may be implemented by the transceiver of the device, and some or all of the other modules may be implemented by the processor of the device.

Figure 8:
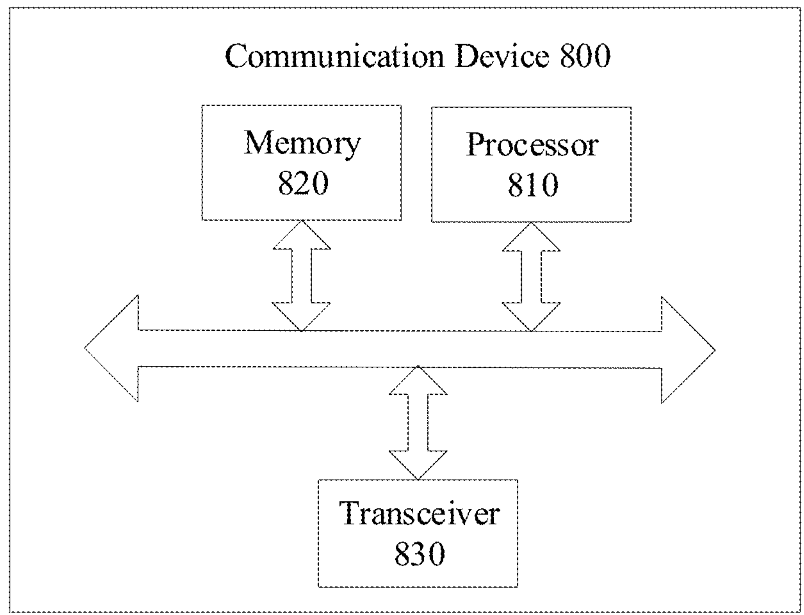
FIG. 8 is a block diagram of a communication device 800 according to some embodiments of this application.

FIG. 8 is a block diagram of a communication device 800 according to some embodiments of this application. The communication device 800 shown in FIG. 8 includes a processor 810, and the processor 810 can call and run a computer program from a memory, so as to implement the method according to some embodiments of this application.

Optionally, as shown in FIG. 8, the communication device 800 may further include a memory 820. The processor 810 may call and run a computer program from the memory 820 to implement the methods according to some embodiments of this application.

The memory 820 may be a separate device independent of the processor 810, or may be integrated in the processor 810.

Optionally, as shown in FIG. 8, the communication device 800 may further include a transceiver 830, and the processor 810 may control the transceiver 830 to communicate with other devices, specifically, may send information or data to other devices, or receive information or data sent by other devices.

In some embodiments, the transceiver 830 may include a transmitter and a receiver. The transceiver 830 may further include antennas, and the number of the antennas may be one or more.

Optionally, the communication device 800 may be the terminal device according to some embodiments of this application, and the communication device 800 may implement the corresponding processes implemented by the terminal device in each method according to some embodiments of this application, which is not repeated here for brevity.

Optionally, the communication device 800 may be the network device according to some embodiments of this application, and the communication device 800 may implement the corresponding processes implemented by the network device in each method according to some embodiments of this application, which is not repeated here for brevity.

Figure 9:
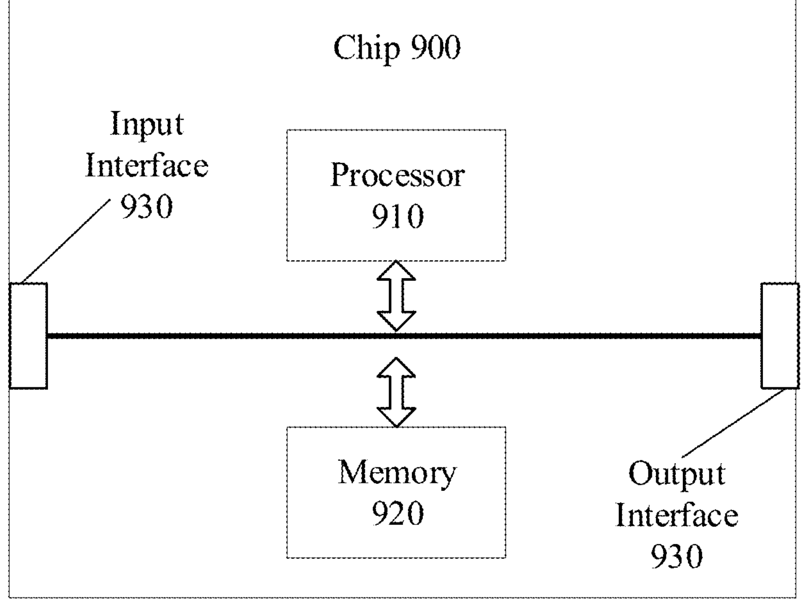
FIG. 9 is a block diagram of a chip 900 according to some embodiments of this application.

FIG. 9 is a block diagram of a chip 900 according to some embodiments of this application. The chip 900 shown in FIG. 9 includes a processor 910, and the processor 910 can call and run a computer program from a memory, so as to implement the method according to some embodiments of this application.

Optionally, as shown in FIG. 9, the chip 900 may further include a memory 920. The processor 910 may call and run a computer program from the memory 920 to implement the method according to some embodiments of this application.

The memory 920 may be a separate device independent of the processor 910, or may be integrated in the processor 910.

Optionally, the chip 900 may further include an input interface 930. The processor 910 may control the input interface 930 to communicate with other devices or chips, and specifically, may acquire information or data sent by other devices or chips.

Optionally, the chip 900 may further include an output interface 940. The processor 910 may control the output interface 940 to communicate with other devices or chips, and specifically, may output information or data to other devices or chips.

Optionally, the chip may be applied to the terminal device according to some embodiments of this application, and the chip can implement the corresponding processes implemented by the terminal device in each method according to some embodiments of this application, which is not repeated here for brevity.

Optionally, the chip can be applied to the network device according to some embodiments of this application, and the chip can implement the corresponding processes implemented by the network device in each method according to some embodiments of this application, which is not repeated here for brevity.

It should be understood that the chip mentioned in some embodiments of this application may also be referred to as a system-level chip, a system chip, a chip system, a system-on-chip, or the like.

The processor mentioned above may be a general-purpose processor, a digital signal processor (DSP), a field programmable gate array (FPGA), an application specific integrated circuit (ASIC) or other programmable logic devices, transistor logic devices, discrete hardware components, and the like. The general-purpose processor mentioned above may be a microprocessor or any conventional processor or the like.

The memory mentioned above may be either volatile memory or non-volatile memory, or may include both volatile and non-volatile memory. The non-volatile memory may be read-only memory (ROM), programmable read-only memory (PROM), erasable programmable read-only memory (EPROM), electrically EPROM (EEPROM) or flash memory. The volatile memory may be random access memory (RAM).

It should be understood that the above memory is an example but not a limitative description, for example, the memory in some embodiments of this application may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), Direct Rambus RAM (DR RAM) and the like. In other words, the memory in some embodiments of this application is intended to include but not limited to these and any other suitable types of memory.

In the above-mentioned embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, all or part of the processes or functions described in some embodiments of this application are generated. The computer may be a general purpose computer, a special purpose computer, a computer network, or other programmable device. The computer instructions may be stored on or transmitted from one computer readable storage medium to another computer readable storage medium, for example, the computer instructions may be transmitted from a website site, computer, server or data center in a wired manner (e.g., coaxial cable, optical fiber, digital subscriber line (DSL)) or a wireless manner (e.g., infrared, wireless, microwave, etc.) to another website site, computer, server or data center. The computer-readable storage medium may be any available medium that can be accessed by a computer or a data storage device such as a server, data center, and the like that includes one or more available medium integrated. The available medium may be a magnetic medium (e.g., a floppy disk, a hard disk, a magnetic tape), an optical medium (e.g., a DVD), a semiconductor medium (e.g., a Solid State Disk (SSD)), and the like.

It should be understood that, in various embodiments of this application, the size of the sequence numbers of the above-mentioned processes does not mean the sequence of execution, and the execution sequence of each process should be determined by its functions and internal logic, and should not constitute any limitation on implementation of some embodiments of this application.

Those skilled in the art can clearly understand that, for the convenience and brevity of description, the specific working process of the above-described systems, devices and units may refer to the corresponding processes in the foregoing method embodiments, which will not be repeated here.

The above are only specific embodiments of this application, but the protection scope of this application is not limited thereto. Those skilled in the art as disclosed in this application may easily think of changes or substitutions, which shall fall within the protection scope of this application. Therefore, the protection scope of this application shall be subject to the protection scope of the claims.

What is claimed is:

1. A method for selecting a random access resource, comprising:

selecting, by a terminal device, the random access resource based on at least one of predefined manners, wherein the predefined manners comprise:

selection based on a round-trip time (RTT) acquired by the terminal device;

selection based on an absolute distance of a service link;

selection based on a delay compensation of a feeder link, wherein the delay compensation of the feeder link is determined by a network device according to a time synchronization reference point specified by a serving cell, wherein the time synchronization reference point comprises a point between a serving satellite and the network device;

selection based on service identity information for triggering a random access procedure by the terminal device;

selection based on a terminal type of the terminal device; and selection based on an access probability parameter;

wherein the method further comprises:

determining, by the terminal device, whether a measurement result of a target cell or the serving cell is greater than or equal to a fourth threshold; and if yes, the terminal device performs said selecting the random access resource based on the at least one of predefined manners; and otherwise, the terminal device selects a four-step type random access resource.

2. The method according to claim 1, wherein the selection based on the RTT acquired by the terminal device comprises:

in response to the RTT acquired by the terminal device being less than or equal to a first threshold, the terminal device selects a two-step type random access resource; and otherwise, the terminal device selects the four-step type random access resource.

3. The method according to claim 2, wherein a manner for acquiring the RTT by the terminal device comprises:

the terminal device receives the delay compensation of the feeder link through a system broadcast message or a dedicated signaling, and calculates the RTT based on the delay compensation of the feeder link and a delay compensation of the service link; or, the terminal device calculates the RTT based on the delay compensation of the service link.

4. The method according to claim 1, wherein the selection based on the absolute distance of the service link comprises:

in response to the absolute distance of the service link being less than or equal to a second threshold, the terminal device selects a two-step type random access resource; and otherwise, the terminal device selects the four-step type random access resource.

5. The method according to claim 4, wherein a manner for determining the absolute distance of the service link by the terminal device comprises:

acquiring, by the terminal device, geographic position information of the terminal device and real-time position information of a serving satellite; and determining the absolute distance of the service link according to the geographic position information of the terminal device and the real-time position information of the serving satellite.

6. The method according to claim 1, wherein the selection based on the delay compensation of the feeder link comprises:

in response to the delay compensation of the feeder link being less than or equal to a third threshold, the terminal device selects a two-step type random access resource; and otherwise, the terminal device selects the four-step type random access resource.

7. The method according to claim 1, wherein the selection based on the service identity information for triggering the random access procedure by the terminal device comprises:

acquiring, by the terminal device, the service identity information for triggering the random access procedure; and in response to the service identity information being a predefined identity, the terminal device selects a two-step type random access resource; and otherwise, the terminal device selects the four-step type Random access resource.

8. The method according to claim 7, wherein the service identity information comprises at least one of following:

an access category (AC) identity; an access cause value identity; and a terminal type identity.

9. The method according to claim 1, wherein selection based on the terminal type of the terminal device comprises:

determining, by the terminal device, the terminal type of the terminal device; and in response to the terminal type of the terminal device being a preset type, the terminal device selects a two-step type random access resource; and otherwise, the terminal device selects the four-step type random access resource.

10. The method according to claim 9, wherein the determining, by the terminal device, the terminal type of the terminal device is performed in at least one of following manners:

acquiring a predefined terminal type of the terminal device;

acquiring the terminal type of the terminal device through a NAS procedure; and determining the terminal type of the terminal device according to capability information of the terminal device.

11. The method according to claim 1, further comprising:

receiving, by the terminal device, predefined manner indication information through a system broadcast message or a dedicated signaling; and determining, according to the predefined manner indication information, a predefined manner for selecting the random access resource.

12. The method according to claim 1, wherein the selection based on an access probability parameter comprises:

in response to the random number falling within a value range specified by the access probability parameter, the terminal device selects one of a two-step type random access resource and a four-step type random access resource; and in response to the random number falling outside the value range specified by the access probability parameter, the terminal device selects another one of the two-step type random access resource and the four-step type random access resource.

13. The method according to claim 1, wherein the random access resource comprises a power ramping parameter configured for controlling behavior of the terminal device after a failed random access attempt, wherein the power ramping parameter specifies power increase amount information, in a single random access procedure, for initiating a next random access attempt after the failed random access attempt.

14. The method according to claim 13, wherein a manner for using the power ramping parameter comprises:

in response to synchronization signal block (SSB) indexes of two consecutive random access attempts being different: after the failed random access attempt, making a transmit power for initiating the next random access attempt equal to a sum of a transmit power corresponding to a previous random access attempt and an increment specified by the power ramping parameter; and in response to the SSB indexes of the two consecutive random access attempts being the same: after the failed random access attempt, making the transmit power for initiating the next random access attempt equal to the transmit power corresponding to the previous random access attempt.

15. A method for selecting a random access resource, comprising:

sending, by a network device, a delay compensation of a feeder link to a terminal device through a system broadcast message or a dedicated signaling, wherein the delay compensation is configured for the terminal device to select the random access resource when a measurement result of a target cell or a serving cell is greater than or equal to a fourth threshold, wherein the delay compensation of the feeder link is determined by the network device according to a time synchronization reference point specified by the serving cell, wherein the time synchronization reference point comprises a point between a serving satellite and the network device.

16. The method according to claim 15, further comprising:

sending, by the network device, ephemeris information or real-time position information of a serving satellite to the terminal device through a system broadcast message, wherein the ephemeris information or the real-time position information is configured for the terminal device to select the random access resource.

17. The method according to claim 15, further comprising:

sending, by the network device, a terminal type of the terminal device to the terminal device through a NAS procedure, wherein the terminal type is configured for the terminal device to select the random access resource.

18. The method according to claim 15, further comprising:

sending, by the network device, predefined manner indication information to the terminal device through a system broadcast message or a dedicated signaling, wherein the predefined manner indication information is configured for indicating the terminal device to determine a predefined manner for selecting the random access resource.

19. A network device, comprising:

a processor and a memory, wherein the memory is configured to store a computer program, and the processor, through invoking and executing the computer program stored in the memory, is configured to implement the method according to claim 15.

20. A terminal device, comprising:

a processor and a memory, wherein the memory is configured to store a computer program, which when executed by the processor, causes the processor to:

select a random access resource based on at least one of predefined manners, wherein the predefined manners comprise:

selection based on a round-trip time (RTT) acquired by the terminal device;

selection based on an absolute distance of a service link;

selection based on a delay compensation of a feeder link, wherein the delay compensation of the feeder link is determined by the network device according to a time synchronization reference point specified by a serving cell, wherein the time synchronization reference point comprises a point between the serving satellite and the network device;

selection based on service identity information for triggering a random access procedure by the terminal device;

selection based on a terminal type of the terminal device; and selection based on an access probability parameter;

wherein the processor is further caused to:

determine whether a measurement result of a target cell or the serving cell is greater than or equal to a fourth threshold; and if yes, the terminal device performs said selecting the random access resource based on the at least one of predefined manners; and otherwise, the terminal device selects a four-step type random access resource.

* * * * *